(12) United States Patent
Stephenson et al.

(10) Patent No.: US 6,770,371 B2
(45) Date of Patent: Aug. 3, 2004

(54) SILANE TRIOL CAPPED EXPOXY-AMINE ADHESION PROMOTER FOR ADHESIVE-BONDED METAL SUBSTRATES

(75) Inventors: Ronald R. Stephenson, Auburn, WA (US); Kay Blohowiak, Issaquah, WA (US); Joseph H. Osborne, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/190,920

(22) Filed: Jul. 8, 2002

(65) Prior Publication Data

US 2004/0005455 A1 Jan. 8, 2004

(51) Int. Cl.⁷ .............................................. B32B 27/38
(52) U.S. Cl. ....................... 428/416; 428/418; 428/448; 428/450; 427/410
(58) Field of Search ................................ 428/413, 447, 428/414, 416, 418, 448, 450; 427/410, 386, 387, 388.1, 407.1, 409; 525/476, 523, 524, 525; 528/28

(56) References Cited

U.S. PATENT DOCUMENTS

| | | |
|---|---|---|
| 5,424,383 A * | 6/1995 | Kimura et al. ................. 528/12 |
| 5,728,203 A | 3/1998 | Vorse et al. |
| 5,789,085 A | 8/1998 | Blohowiak et al. |
| 5,807,430 A | 9/1998 | Zheng et al. |
| 5,814,137 A | 9/1998 | Blohowiak et al. |
| 5,849,110 A | 12/1998 | Blohowiak et al. |
| 5,869,140 A | 2/1999 | Blohowiak et al. |
| 5,869,141 A | 2/1999 | Blohowiak et al. |
| 5,902,847 A | 5/1999 | Yanagi et al. |
| 5,939,197 A | 8/1999 | Blohowiak et al. |
| 5,958,578 A | 9/1999 | Blohowiak et al. |
| 6,037,060 A | 3/2000 | Blohowiak et al. |
| 2003/0069331 A1 * | 4/2003 | Teiichi et al. ................ 523/176 |

* cited by examiner

*Primary Examiner*—David J. Buttner
*Assistant Examiner*—Christopher Keehan

(57) ABSTRACT

A water-based oligomer adhesion promoter material that promotes adhesion of paste adhesives used for structural bonding of metal components. The water-based system provides a convenient, one-step ambient cure process that minimizes the use of hazardous solvents. Reinforced metal substrates using the adhesion promoter material in conjunction to an ambiently cured paste adhesive offer significant improvement in terms of fatigue resistance. When used in repairing metal substrates having fatigue cracks, the adhesion promoter in conjunction with an ambiently cured paste adhesive minimizes fatigue crack propagation, thereby increasing the usable life of the metal substrate in strength bearing applications.

11 Claims, 1 Drawing Sheet

SILANE TRIOL CAPPED EXPOXY-AMINE ADHESION PROMOTER FOR ADHESIVE-BONDED METAL SUBSTRATES

STATEMENT REGARDING FEDERALLY SPONSORED RESEARCH

This invention was made with Government support under Contract No. F33615-95-D-3203. The Government has certain rights in this invention.

TECHNICAL FIELD

The present invention generally relates to metal treatments for adhesive-bonded metal substrates and more specifically to silane triol capped epoxy-amine adhesion promoters for adhesive-bonded metal substrates.

BACKGROUND ART

Fatigue of aircraft structure is one of the problems limiting the useful life of aircraft, including military aircraft. Adhesively bonded repairs and/or reinforcements are key approaches for maintaining aging aircraft, especially as a remedy for fatigue cracks. Adhesive bonding is also important for maintaining other Department of Defense weapons systems. Bonded repairs provide substantial cost savings and reduced aircraft downtime when compared to component replacement. Bonded repairs also have several advantages over traditional repair approaches using mechanical, including improved structural efficiency, improved fatigue life due to the elimination of fastener holes, and weight savings.

Currently available paste adhesives often do not provide satisfactory bonding to metal surfaces in the absence of metal treatment. Metal treatment prior to bonding is a key factor for both the initial adhesion of a paste adhesive and for long-term durability. Current metal prebond surface preparations, however, especially for on-aircraft repair, are inconvenient to use and/or often do not provide the performance necessary for successful long-term durable bonds. Past bond failures, primarily due to inadequate surface preparation, have been a limiting factor in the current use of bonded repairs.

One strategy used to improve the adhesion of the paste adhesive is to introduce a primer coating, also known as an adhesion promoter coating, prior to the introduction of the adhesive bonding material. However, metal bond primers typically contain hazardous components such as volatile organic compounds and hexavalent chromium and as such are severely limited in available use for depot and repair due to environmental and safety concerns.

Another problem with metal bond primers is they typically require a heat cure of at least 250 degrees Fahrenheit. These temperatures, however, can damage the support structure of the aircraft by expansion of water within the honeycomb structure or plasticization of existing adhesive/composite resins. Further, metal bond primers are typically applied over a conversion coating containing hexavalent chromium, and reapplication of conversion coating for repair operations is not practical. The use of metal bond primers is thus severely limited.

Another strategy commonly used to improve adhesion of the paste adhesive is to use an adhesion promoter such as a silane adhesion promoter. The use of silane adhesion promoters, however, involves a two-step process for applying a paste adhesive to the aircraft, wherein the silane monomer is first applied to the metal substrate and subsequently reacted with an additional coating.

Consequently, it would be highly desirable to provide a chrome-free, low volatile organic, protective and adhesion promoting composition for a metal substrate. It is also desirable if the composition could be applied to the metal substrate via a single pack system. It is further desirable if the composition is capable of being cured in ambient conditions.

SUMMARY OF THE INVENTION

By reacting water-based bisphenol A epoxy resins with primary aliphatic amine compounds and hydrolyzed alkoxysilane compounds, a water-based oligomer adhesion promoter material may be formed that promotes adhesion of paste adhesives used for structural bonding of metal components.

The present invention offers many improvements over previous paste adhesive systems. For example, because the adhesion promoter is ambiently cured, manufacturing costs associated with elevated temperature curing are eliminated. Further, the elimination of an elevated temperature curing step also may prevent damage to support structures associated with expansion of water and plasticization of the adhesive/composite resins. Further, by improving adhesion between the paste adhesive and substrate, a significant improvement in long-term strength of metal substrates is realized. This is very beneficial for strength requiring applications such as for use on military or commercial aircraft. Also, by introducing the adhesion promoter within fatigue cracks prior to application of the paste adhesive, a significant decrease in crack propagation is realized, resulting in longer usable life of the metal substrates. Further, the present invention does not utilize hexavalent chromium or large amounts of volatile organic compounds, thereby lessening environmental concerns and limiting costs in terms of hazard prevention and cleanup.

BEST MODES FOR CARRYING OUT THE INVENTION

Figure 1:
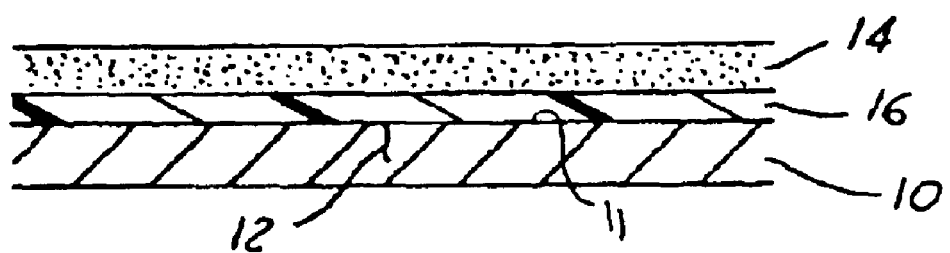
FIG. 1 is a cross-section view of a metal substrate having a fatigue crack that is repaired with an adhesively bonded reinforcement material according to one preferred embodiment of the present invention.
Figure 2:
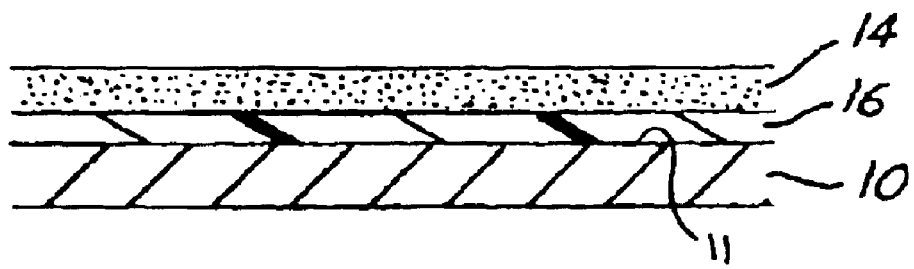
FIG. 2 is a cross-section view of a metal substrate having an adhesively bonded reinforcement material according to another preferred embodiment of the present invention.

FIGS. 1 and 2 represent two preferred embodiments wherein an adhesion promoter material may be used in conjunction with a paste adhesive to repair and/or reinforce metal substrates used in strength-requiring applications.

Referring to FIG. 1, a metal substrate 10, or metal adherend, is shown in cross-section as having a fatigue crack 12 that has been covered with a paste adhesive 14. To promote adhesion of the paste adhesive 14 to the metal substrate 10, an adhesion promoter 16 is added to the outer surface 11 of the metal substrate 10 prior to the introduction of the paste adhesive 14. The adhesion promoter 16 also infiltrates the interstices of the fatigue crack 16 to promote adhesion of the adhesive 14 within the crack 12. In this way, the metal substrate 10 is repaired to prevent further propagation of the fatigue crack 12. This increases the usable life of the metal substrate 10, especially in applications such as when the metal substrate is used in military and commercial aircraft applications, for example.

In FIG. 2, the adhesion promoter 16 and paste adhesive 14 are added to the metal substrate 10 without having a fatigue crack 12. As above, the adhesion promoter 16 promotes adhesion of the adhesive 14 to the outer surface 11 of the metal substrate 10. In this way, the metal substrate 10 can exhibit enhanced fatigue resistance as compared with substrates 10 not having the paste adhesive 14 reinforcement.

The paste adhesive 14 of FIGS. 1 and 2 is a suitable ambiently curable paste adhesive that is well known in the art. One example of a paste adhesive 14 that may be used in Hysol's EA 9309.3 NA.

The composition of the adhesion promoter 16 comprises the reaction product of a bisphenol A type epoxy resin, at least one multifunctional primary aliphatic amine, and a hydrolyzed alkoxysilane compound that forms a silane triol capped epoxy-amine resin adhesion promoter 16. Of course, other ingredients well known to those of skill in the art may also be added to the promoter 16, including but not limited to corrosion inhibitors, pigments, fillers, thixotropic agents, and solvents.

The multifunctional bisphenol A epoxy resin is formed from the reaction product of bisphenol A epoxies with epichlorohydrin and had an epoxy equivalent weight of preferably between 250 and 15000 (or a molecular weight of between 500 and 30000). The chemical formula for the bisphenol A epoxy resin is:

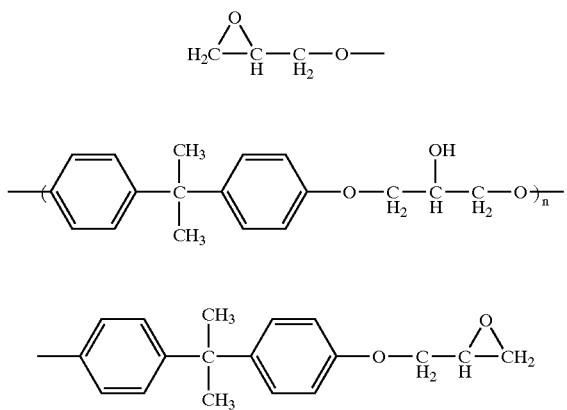

Wherein n is equal to the number of repeating units with the bisphenol A epoxy resin such that the molecular weight of the bisphenol A epoxy resin is between 500 and 30,000. For example, one preferred epoxy resin is Shell Chemical's 5522-WY-55 bisphenol A epoxy resin, which has a epoxy equivalent weight of about 625, available from Resolution Performance Products, which is provided at 55% solids in 2-propoxyethanol.

The amine is a multifunctional low molecular weight primary aliphatic amine having an equivalent weight (based on reactive hydrogens) of approximately 135–195 and having the general formula:

One preferred primary aliphatic amine is Shell Chemical's 8290-Y60 aliphatic amine curing agent, available from Resolution Performance Products, which is provided at 60% solids in 2-propoxyethanol and has an equivalent weight, based on reactive hydrogens, of approximately 165.

The silane moiety is typically prepared from an alkoxysilane and has a generalized hydrolyzed formula:

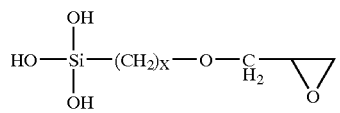

where x is between 1 and 5 repeating units. Two preferred alkoxysilanes that are used are hydrolyzed silanes based on (3-glycidoxypropyl) trimethoxysilane or (3-glycidoxypropyl)triethoxysilane.

The reaction mechanism for forming the adhesion promoter 16 from the bisphenol A epoxy, multifunctional primary aliphatic amine, and hydrolyzed alkoxysilane is described as follows:

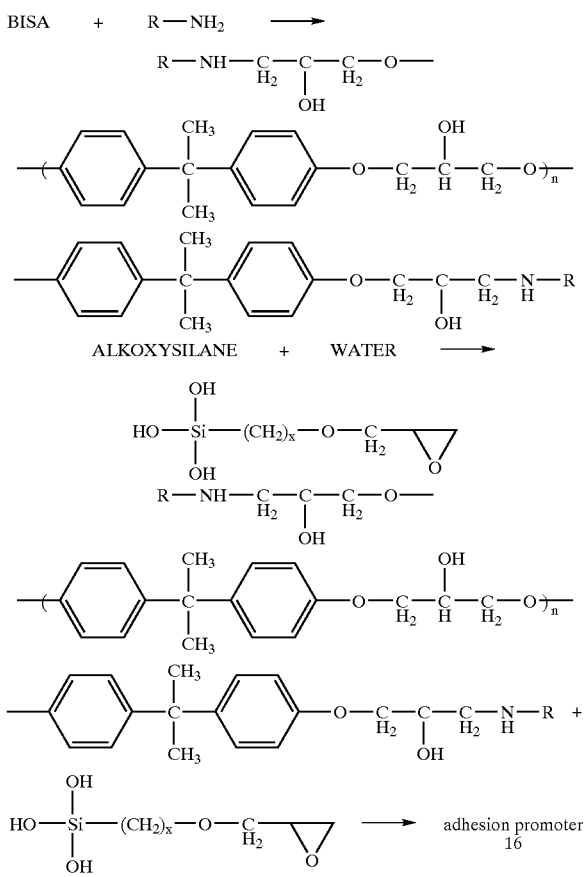

During the curing process, the hydroxysilane groups will condense to crosslink with the epoxy amine adduct and react with hydroxyl groups on the surface of the metal substrate 10 to promote adhesion between the substrate 10 and adhesion promoter 16. Functional groups elsewhere on the surface of the adhesion promoter 16 will also be available to promote adhesion between the adhesion promoter 16 and the paste adhesive 14.

One embodiment of the adhesion promoter 16 of the present invention in shown below in Example 1:

EXAMPLE 1

Combine 20.94 grams of Shell 5522-WY-55 bisphenol A epoxy resin and 5.46 grams of Shell 8290-Y-60 aliphatic amine curing agent in a reaction vessel and stir until blended. The mixture was left to stand for about 20 minutes. In a separate vessel, combine 2.13 grams of (3-glycidoxypropyl)trimethoxysilane and 6 grams of water and stir until blended for about 10 minutes to form a hydrolyzed silane solution. The silane solution is then added to the epoxy-amine solution and stirred until blended. The epoxy functional groups of the hydrolyzed silanes condense with the epoxy-amine solution.

Next, add an additional 1.47 grams of the Shell 8290-Y-60 aliphatic amine-curing agent to the mixture and stir until blended. Adjust the viscosity by adding 10 grams of water and stir until blended. The mixture is then allowed to stand for approximately 15 minutes, forming the silane capped triol epoxy amine resin adhesion promoter 16.

The formed adhesion promoter 16 is then applied to clean, bare deoxidized metal adherends and allowed to cure at ambient conditions. The hydroloyzed silane groups will condense with the metal hydroxyl groups on the surface of the substrate and crosslink to increase molecular weight of the adhesion promoter. A suitable cured paste adhesive such as Hysol's EA 9309.3 NA is then applied to the coated metal adherend. The paste adhesive will be suitably cured when allowed to stand at room temperature (approximately 20–25 degrees Celsius, or around 72 degrees Fahrenheit) for about 7 days.

Wedge crack specimens of 2024-T3 coupons utilizing the coating formulation of Example 1 were tested in accordance with ASTM D3762 at 120 degrees Fahrenheit and 98% RH for 7 days. The coupons surpassed crack growth requirements and percent cohesive failure as compared with coupons utilizing BAC5010 Type 60 primer applied over hydrofluoric acid etched and alodined surfaces. The tests above were performed using Hysol EA 9309.3 NA adhesive.

The present invention offers many improvements over previous paste adhesive systems. For example, because the adhesion promoter is ambiently cured, manufacturing costs associated with elevated temperature curing are eliminated. Further, the elimination of an elevated temperature curing step also may prevent damage to support structures associated with expansion of water and plasticization of the adhesive/composite resins. Further, by improving adhesion between the paste adhesive and substrate, a significant improvement in long term strength of metal substrates is realized. This is very beneficial for strength requiring applications such as for use on military or commercial aircraft. Also, by introducing the adhesion promoter 16 within fatigue cracks 12 prior to application of the paste adhesive 14, a significant decrease is crack propagation is realized, resulting in longer usable life of the metal substrates 10. Further, the present invention does not utilize hexavalent chromium or large amounts of volatile organic compounds, thereby lessening environmental concerns and limiting costs in terms of hazard prevention and cleanup.

While the invention has been described in terms of preferred embodiments, it will be understood, of course, that the invention is not limited thereto since modifications may be made by those skilled in the art, particularly in light of the foregoing teachings.

What is claimed is:

1. A method of reinforcing metal substrates and preventing crack propagation in metal substrates comprising:
   providing a metal substrate having a substantially clean outer surface;
   providing a paste adhesive;
   reacting a bisphenol A type epoxy ether resin with a primary aliphatic amine to form an epoxy amine adduct;
   reacting an alkoxysilane with water to form a hydrolyzed alkoxysilane;
   reacting said epoxy amine adduct with said hydrolyzed alkoxysilane to form an ambiently curable adhesion promoter;
   applying said adhesion promoter to said outer surface of said metal substrate;
   curing said adhesion promoter to said metal substrate under ambient conditions;
   applying said paste adhesive to said adhesion promoter; and
   curing said paste adhesive.

2. The method of claim 1, wherein said alkoxysilane compound comprises (glycidoxy)trimethoxysilane.

3. The method of claim 1, wherein said alkoxysilane compound comprises (glycidoxy)triethoxysilane.

4. The method of claim 1, wherein said multifunctional primary aliphatic amine resin comprises a multifunctional low molecular weight primary aliphatic amine having an equivalent weights based on active hydrogens, of between 135 and 195.

5. The method of claim 1, wherein applying said adhesion promoter to a metal substrate comprises applying said adhesion promoter to an outer surface of said metal substrate such that said adhesion promoter infiltrates the interstices of a crack formed within said metal substrate.

6. A reinforced metal substrate having improved fatigue resistance and reduced fatigue crack propagation suitable for use in strength-requiring applications comprising:
   a metal substrate having an outer surface;
   an adhesion promoter ambiently cured to said outer surface; and
   a paste adhesive ambiently cured to said adhesion promoter such that said adhesion promoter is between said metal substrate and said paste adhesive;
   wherein said adhesion promoter is formed by:
      reacting a bisphenol A type epoxy ether resin with a primary aliphatic amine to form an epoxy amine adduct;
      reacting an alkoxysilane with water to form a hydrolyzed alkoxysilane; and
      reacting said epoxy amine adduct with said hydrolyzed alkoxysilane.

7. The reinforced metal substrate of claim 6, wherein said alkoxysilane compound comprises (glycidoxy)trimethoxysilane.

8. The reinforced metal substrate of claim 6, wherein said alkoxysilane compound comprises (glycidoxy)triethoxysilane.

9. The reinforced metal substrate of claim 6, wherein said multifunctional primary aliphatic amine resin comprises a multifunctional low molecular weight primary aliphatic amine having an equivalent weight, based on active hydrogens, of between 135 and 195.

10. The method of claim 1, wherein said bisphenol A type epoxy ether resin has an epoxy equivalent weight of between approximately 250 and 15,000.

11. The reinforced metal substrate of claim 6, wherein said bisphenol A type epoxy ether resin has an epoxy equivalent weight of between approximately 250 and 15,000.

* * * * *